W. A. McQUAGGE.
EMERGENCY AXLE.
APPLICATION FILED NOV. 29, 1920.
1,383,554.
Patented July 5, 1921.
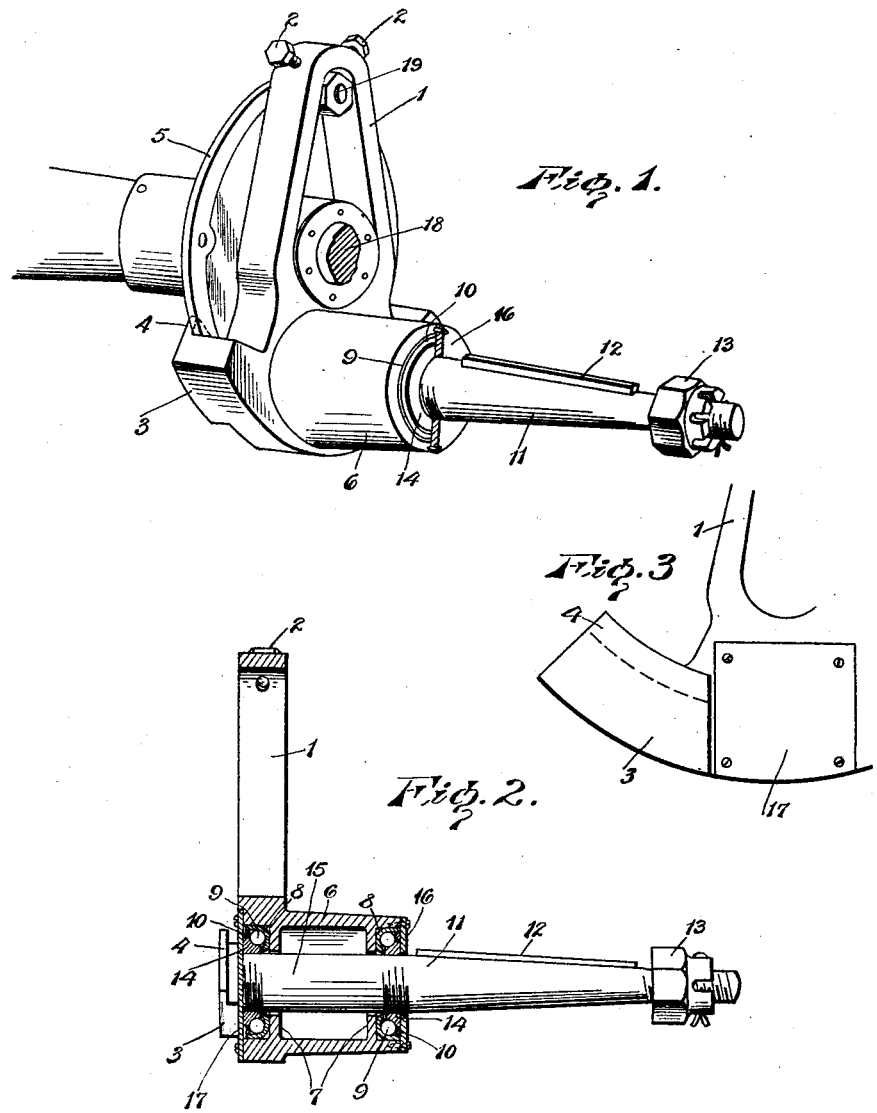
Inventor
W. A. McQuagge
By Lacey & Lacey, Attorneys

UNITED STATES PATENT OFFICE.

WILLIAM ALBERT McQUAGGE, OF MARIANNA, FLORIDA.

EMERGENCY-AXLE.

1,383,554.   Specification of Letters Patent.   Patented July 5, 1921.

Application filed November 29, 1920. Serial No. 427,025.

*To all whom it may concern:*

Be it known that I, WILLIAM A. Mc-QUAGGE, a citizen of the United States, residing at Marianna, in the county of Jackson and State of Florida, have invented certain new and useful Improvements in Emergency-Axles, of which the following is a specification.

The object of this invention is to provide a simple, inexpensive and efficient device by the use of which a motor vehicle which has been disabled through breaking of an axle may be readily towed to a garage or service station where a new axle may be supplied. A well-known type of automobile which is used in large numbers has been demonstrated to be very susceptible to breakage of the rear axle and the owners and operators of such vehicles are subjected to great annoyance through the axle breaking at remote points in sparsely settled neighborhoods so that they are obliged to leave the vehicle upon the road and proceed to find a garage or repair station from which a crew may be recruited to proceed to the point of the accident and there repair the vehicle or tow it back to the repair station. One embodiment of the invention is illustrated in the accompanying drawings and will be hereinafter fully described, it being understood that the form of the invention may be varied in minor features within the scope of the appended claims.

In the drawings—

Figure 1 is a perspective view of my emergency axle in its operative position;

Fig. 2 is a longitudinal section;

Fig. 3 is an enlarged detail rear elevation.

In carrying out my invention, I employ a yoke 1 which is of substantially triangular form and equipped at its upper end with one or more set screws 2, as shown. At its lower end, the yoke is provided on one side with lugs 3 having flanges 4 on their upper edges adapted to engage under and behind the axle housing on the brake drum, as indicated at 5. Upon the opposite side of the yoke, at its lower end, is a laterally extending sleeve or hub 6 which is open at both ends and is provided internally with annular stop flanges 7, as clearly shown in Fig. 2. Against the outer sides of the said flanges 7, I seat race rings 8 having anti-friction balls 9 fitted therein and held thereto by retainers or caps 10 secured in the outer sides of the race rings. A spindle 11 is inserted through the hub or sleeve 6 and is equipped with a key 12 whereby the wheel which was mounted upon the broken axle may be secured to the spindle. A retaining nut 13 is fitted upon the outer end of the spindle so as to prevent the wheel moving endwise of the spindle, as will be readily understood. Cones 14 are secured upon the inner cylindrical end portion 15 of the spindle and engage the anti-friction balls 9, as clearly shown, so that the spindle may rotate freely within the hub or sleeve 6 and it will be understood, of course, that the cones are threaded onto the spindle so that they will aid in preventing endwise movement of the same. To prevent the entrance of dust to the interior of the hub or sleeve 6, I secure to the opposite ends thereof the cover plates 16 and 17, as shown and as will be readily understood.

The manner of use of the device is thought to be obvious from the drawings and the above description. It will be readily noted that when the yoke 1 is fitted upon the broken axle, indicated at 18, and a stud bolt 19 on the axle housing 5, the set screws 2, by being turned home against the said stud bolt or screw, will draw the yoke into positive clamping engagement with the axle housing and the broken axle so that the device will be held in fixed relation to the vehicle. The wheel mounted upon the spindle 11 will occupy approximately the same position as the wheel which was disabled and the vehicle can then be very readily towed to a point where complete repairs may be made and a new axle fitted thereto. The device is exceedingly simple and will, when in use, add practically nothing to the dead-weight of the machine while it will facilitate the bringing of the machine to a repair station and will avoid and overcome the annoyance which has been heretofore due to the necessity of leaving a disabled machine upon a road.

Having thus described the invention, what is claimed as new is:

1. A device for the purpose set forth comprising a yoke having a hub extending laterally from one side at its lower end, said hub being provided internally near its opposite ends with annular stop flanges, a spindle fitted through said hub and through said stop flanges, anti-friction bearings interposed between the hub and the spindle at the ends of the hub and at the outer sides of said stop flanges, and cover plates secured upon the ends of the hub and extending over said bearings.

2. A device for the purpose set forth comprising a yoke adapted to be fitted to an axle housing and provided at its lower end on one side with flanged lugs to engage under and back of said housing, a hub projecting laterally from the opposite side of the yoke at the lower end thereof, a spindle rotatably mounted in said hub, means for retaining the spindle in the hub, and wheel-securing means upon the outer portion of the spindle.

In testimony whereof, I affix my signature.

WILLIAM ALBERT McQUAGGE. [L. S.]